United States Patent
Berg et al.

[19]

[11] Patent Number: 6,125,008
[45] Date of Patent: Sep. 26, 2000

[54] FLYING HEAD POSITIONER HAVING ROTATIONAL FINE POSITIONING AND ADJUSTABLE ACTUATOR LOAD

[75] Inventors: John S. Berg, Bellingham, Mass.; Neville K. S. Lee, Kowloon, The Hong Kong Special Administrative Region of the People's Republic of China

[73] Assignee: Digital Papyrus Corporation, Sunnyvale, Calif.

[21] Appl. No.: 08/839,766

[22] Filed: Apr. 15, 1997

Related U.S. Application Data

[60] Provisional application No. 60/015,493, Apr. 15, 1996, provisional application No. 60/015,741, Apr. 15, 1996, provisional application No. 60/015,489, Apr. 15, 1996, provisional application No. 60/015,442, Apr. 15, 1996, and provisional application No. 60/016,848, May 3, 1996.

[51] Int. Cl.[7] .................................................. G11B 5/56
[52] U.S. Cl. .......................................... 360/106; 360/109
[58] Field of Search .................................. 360/104, 106, 360/109

[56] References Cited

U.S. PATENT DOCUMENTS

| | | | |
|---|---|---|---|
| 3,894,180 | 7/1975 | Canino | 178/6.6 R |
| 4,188,645 | 2/1980 | Ragle et al. | 360/75 |
| 4,605,977 | 8/1986 | Matthews | 360/103 |
| 4,814,907 | 3/1989 | Goor | 360/75 |
| 5,111,348 | 5/1992 | Baba | 360/77.06 |
| 5,189,578 | 2/1993 | Kenji et al. | 360/106 |
| 5,255,135 | 10/1993 | Itoh et al. | 360/75 |
| 5,311,378 | 5/1994 | Williams et al. | 360/77.03 |
| 5,359,474 | 10/1994 | Riederer | 360/78.05 |
| 5,377,058 | 12/1994 | Good et al. | 360/75 |
| 5,392,173 | 2/1995 | Kinoshita et al. | 360/75 |
| 5,504,731 | 4/1996 | Lee et al. | 369/112 |
| 5,521,778 | 5/1996 | Boutaghou et al. | 360/106 |

FOREIGN PATENT DOCUMENTS

| | | |
|---|---|---|
| 0 242 597 | 10/1987 | European Pat. Off. . |
| 0 341 829 | 11/1989 | European Pat. Off. . |
| 0 409 468 | 1/1991 | European Pat. Off. . |
| 2-179933 | 7/1990 | Japan . |
| 5-174524 | 7/1993 | Japan . |

OTHER PUBLICATIONS

IBM Technical Disclosure Bulletin, vol. 37, No. 8, Aug. 1, 1994, Armonk, NY, U.S., pp. 401–403, "Shock–Resistant Rotary Microactuator For Fine Positioning Of Recording Heads".

*Primary Examiner*—A. J. Heinz
*Attorney, Agent, or Firm*—Wolf, Greenfield & Sacks, P.C.

[57] ABSTRACT

A flying head mechanism includes a flying head, a suspension and an actuator which applies a load force through the suspension. The load force applied by the actuator is adjustable while the head is in operation. The actuator may actively control load force as part of a feedback loop which maintains the flying head at a constant flying height. One embodiment disclosed includes a voice coil actuator. In embodiments using an optical flying head, a conventional focus sensor may provide a signal indicative of flying height, since the focus signal inherently indicates flying height error. The flying head includes a contact sensor which detects head/disk contact. The head further includes means for changing the focus of the optical elements, without changing the flying height of the head. The entire suspension is mounted in a shock and vibration immune configuration. Two heads may be used in some embodiments, in which more than one type of media may be read or written by the disk drive.

16 Claims, 10 Drawing Sheets

FLYING HEAD POSITIONER HAVING ROTATIONAL FINE POSITIONING AND ADJUSTABLE ACTUATOR LOAD

CROSS-REFERENCE TO RELATED APPLICATION

This application is related to the present inventors' U.S. patent applications Ser. No. 08/804,301, entitled FLYING HEAD WITH ADJUSTABLE ACTUATOR LOAD, filed Feb. 21, 1997 and Ser. No. 08/824,605, entitled METHOD AND APPARATUS FOR DETECTING THE MINIMUM GLIDE HEIGHT OF A FLYING HEAD AND FOR FOCUSING A LENS CARRIED ON A FLYING HEAD, filed Mar. 26, 1997, now abandoned, which claim the benefit of U.S. Provisional Application Ser. Nos. 60/015,493; 60/015,741; 60/015,489; 60/015,442, all filed on Apr. 15, 1996, and Ser. No. 60/016,848, filed on May 3, 1996.

BACKGROUND

1. Field of the Invention

The present invention relates generally to disk drive systems including an apparatus for positioning a flying head over a disk.

2. Related Art

Extremely high density data storage systems based on magneto-optic and optical storage disk media store data in at least one track including a series of very small regions, each region termed either a mark or a space. Marks are regions altered by a writing process and spaces are the regions between marks. The values of one or more bits are encoded as the lengths of the marks and spaces, depending upon the encoding technology. The track may be 0.2 μm wide, with marks and spaces being one or more times that length. Because very small regions of this storage medium are used to represent information, a transducer system which can discriminate those regions with a high degree of resolution is used so that each bit can be accessed separately. If a single track is used, it forms a spiral with a close spacing or pitch between windings. If multiple tracks are used, they are also arranged with a close spacing or pitch therebetween. Because of the close spacing between the multiple track or track windings, high storage density requires accurate positioning of the transducer relative to the pitch of the track or tracks formed on the surface of the medium.

High density disk drive systems based on magneto-optic and optical storage principles generally use a transducer system which does not, under normal operating conditions, contact the surface of the recording medium. Some such non-contact transducers are known in this art as flying heads because of the principles upon which they rely to maintain a correct position with respect to the surface of the recording medium. A brief description of how a flying head flies is now given, with reference to FIG. 15.

During operation of a disk drive, the recording medium, typically in the form of a specially coated disk of aluminum, glass or plastic, rotates at high speeds, e.g., 3600 RPM. The rotary motion of the disk 107 causes an air flow in the direction of rotation, near the surface 106 of the disk 107. The head 101 is placed by a mechanical actuator or load arm 103 in proximity with the surface 106 of the disk so that the air flow passes between the surface of the disk and the lower features of the head, thereby forming a cushion of air 108 which generates an upwards force $F_A$ on the head 101 due to air pressure in the space between the disk surface and the lower features of the head 101, with the lower features of the head defining an air bearing surface 110. The cushion of air 108 that develops between the air bearing surface 110 and the surface 106 of the disk is referred to hereinafter as an air bearing.

The flying head 101 flies at a flying height 113, defined herein as the separation distance between the air bearing surface 110 of the head 101 and the surface 106 of the disk, determined by the force balance between the air pressure $F_A$ of the air bearing 108 pushing the head 101 away from the surface 106 of the disk, and a downward force $F_L$ exerted through a spring 105 or suspension that mounts the head 101 to the load arm or actuator 103.

The force $F_L$ has a magnitude determined by the physical dimensions of the spring, the spring constant of the spring material and the deformation of the spring which occurs in operation. The upward force $F_A$ applied by the air bearing depends on the finish of the disk surface, the linear velocity of the disk surface where it passes under the head, and the shape and size of the air bearing surface of the head. Whenever $F_A$ and $F_L$ are not equal, the head experiences a net force which causes it to move in a vertical direction corresponding to the direction of the net force. When $F_L=F_A$, the head experiences no net force, and hence no vertical motion.

In conventional systems, as flying height 113 increases, the air bearing 108 grows, lowering $F_A$, while spring 105 is compressed, raising $F_L$. The relationship between each of the forces $F_L$ and $F_A$ and flying height 113 can be determined by application of aerodynamic principles to the system configuration, which can be done by making measurements on actual systems, or physical or computer-generated models of the system. The conventional system is designed so that $F_L=F_A$ at the desired flying height when the disk 107 is spinning at its normal speed. When the disk spins down, i.e., slows to a stop, insufficient air flow occurs to maintain the air bearing between the head and disk. Hence, insufficient air pressure and force are generated to counteract the downward force exerted by the spring or suspension, leading to contact between the head and disk. Thus, when the disk 107 slows to a stop, the head 101 may come to rest on the disk surface 106. Alternatively, the disk drive may include a mechanism that lifts the suspension 103 to prevent contact between the head and disk when the disk spins down, but otherwise plays no role in normal disk drive operation.

Flying height 113 is one important parameter governing successful operation of a disk drive. At extremely large values for flying height 113, excessive distance from the disk can cause unacceptable functional performance, for example, an inability to discriminate high frequency signals. Close proximity of the head to the disk improves functional performance. However, at extremely small values for flying height 113, insufficient flying height or loss of separation between the head and the disk can result in aerodynamic instability, reliability problems and catastrophic product failure, e.g., a head crash which occurs when the head contacts the disk surface with sufficient force to cause damage to the head or the disk surface resulting in a loss of data. Avoiding potential damage often associated with contact between the head and disk is the reason that some disk drives move their heads away from the disk surface to avoid contact when the disk spins down. The lowest height at which the head can fly without making contact with the disk surface is defined as the minimum glide height for the disk. Asperities (i.e., microscopic bumps or roughness) in the disk surface are those features which are likely to be contacted first by the head.

One problem of disk drive manufacturing is that the physical parameters determinative of flying height, e.g., the spring characteristics (affecting load force), the design of the air bearing surface shape, manufacturing variations in the air bearing surface geometry and finish (affecting air bearing force), and the load arm position relative to the surface of the disk (affecting load force), exhibit some variation within a tolerance band which causes a corresponding variation in the load force or air bearing force and, in turn, flying height. Other sources of variation in flying height in a disk drive include variations in altitude (i.e., ambient air density), radial position of the head on the disk which varies the velocity of the air flow due to different track circumferential lengths at different track radii, and skew angle of the head relative to a line tangential to a track, all of which affect the air bearing force.

Conventionally, flying height is set by a mechanical adjustment made at the time of manufacture of a disk drive. The mechanical adjustment sets a static load force selected to provide a desired flying height under nominal conditions. For example, the static load force may be measured manually and adjusted by repositioning or bending the load arm 103. Once set, the static load force remains substantially unaltered for the life of the disk drive, despite variations in operating conditions which may cause variation in other parameters determinative of flying height. Conventional systems are also known which employ closed loop feedback control systems to maintain a substantially constant flying height. Although such systems can compensate for variations in some parameters, there remain other uncompensated tolerance errors, such as variation in the actual minimum glide height from one disk to another.

Thus, flying height in conventional disk drives cannot be set to the minimum glide height. Rather, tolerance variations such as discussed above are typically taken into consideration, adding a tolerance band to the nominal or design minimum glide height of a disk when setting the actual flying height. Therefore, in order to avoid any likelihood of unwanted contact between the head and the surface of the disk, conventional systems set a nominal flying height that is greater than the largest expected actual minimum glide height. Conventional systems use this tolerance band because they have no way of determining the actual minimum glide height for the disk.

In view of the foregoing, one problem encountered in the prior art is that conventional flying head systems are unable to fly at the actual minimum glide height for a disk. By failing to fly at the minimum glide height, conventional systems exhibit poorer resolution than that of which they are theoretically capable. Moreover, in systems in which energy is transferred to the optical disk by an evanescent wave emitted from an optical element such as a lens through which an optical signal is passed, the energy transferred to the optical disk may be less than theoretically achievable. Therefore, in order to maintain an adequate signal at the disk surface, a more powerful laser might be required in such a conventional system.

Another problem with conventional optical disk drive systems is described making reference to FIG. 20, which illustrates an optical flying head and related disk drive components. The optical flying head 2001 includes a body 2003 having a lower surface defining an air bearing surface 2005. The head 2001 also has a two-element lens 2007 affixed to the body 2003. A laser light source 2009 emits a collimated laser beam 2011 which is passed through the lens, focused onto the recording medium surface 2013 and returned through a beam splitter 2015 to a detector 2017. When properly focused, the beam is caused to converge exactly at the recording medium surface. The focal length of the lens, i.e., the distance at which the collimated laser beam will converge after passing through the lens, is fixed. This distance depends on the lens element shapes and sizes. It is desired to minimize the spot size of the focused beam in order to maximize data storage density on the disk surface. Conventional systems are designed by those skilled in this art to use a diffraction limited lens system at the wavelength of the laser beam emitted by the laser light source and numerical aperture of interest, i.e., one in which the wavefront error is minimized by correctly setting the distance between lens elements for the anticipated flying height. If the beam fails to converge exactly at the recording medium surface due to flying height variation or other tolerances, then the density at which information can be recorded or recovered may be adversely affected.

In view of the foregoing, another problem encountered in conventional flying head systems is controlling the height of the lens above the disk so that it remains at the focal length of the lens. Since conventional systems fixedly mount the lens to the head, variations in flying height of the head necessarily result in variations in the height of the lens above the disk, which can result in degraded performance if that height is not at the focal length of the lens. In addition, variations in other characteristics of the system, including the positioning of the lens relative to the air bearing surface and the shape of the lens, can also affect whether focus is achieved. Conventional systems cannot independently compensate for these variations, because the height of the lens above the disk can be controlled only by varying the height of the head to which the lens is fixed.

As anyone with a conventional portable compact disk (CD) player knows, even the relatively coarse positioner of such a system is extremely susceptible to externally applied mechanical shocks. As briefly mentioned at the beginning of this specification, yet another problem of conventional systems is that the head must be positioned with an extremely fine positional resolution to properly discriminate between closely spaced adjacent tracks. However, a requirement for extremely fine positional resolution renders the system more susceptible to mechanical shock and vibration.

Another problem of conventional systems is to provide very fast positioning over a wide range of track positions, while also providing extremely high track position resolution to discriminate between closely spaced tracks. One conventional solution to this problem is to provide both a coarse positioner and a fine positioner which cooperate to position the head at the proper location. A conventional coarse positioner can quickly move the head to an approximate position defined by any track or group of tracks on a disk, but cannot accurately position to or follow the track on which reading and writing are to take place with sufficient accuracy. Therefore, once roughly positioned by the coarse positioner, the head is more finely positioned by the fine positioner. The fine positioner conventionally has a range of movement covering a distance equal to the span of distance occupied by a small group of tracks, or less, but extremely fine resolution. A problem with this conventional arrangement is that each time the coarse positioner operates to move the head by several tracks to a new track group, the movement has a similar effect upon the fine positioner as an external mechanical shock. That is, the coarse positioner adds to the final position error which the fine positioner will overcome, a transient error due to an induced mechanical shock. When the coarse positioner ceases its movement, the fine positioner must then overcome the induced mechanical shock, as well as position accurately over the target track before reading or writing of data can commence. This movement of the fine positioner takes longer to accomplish than movement of the fine positioner over the same distance would take if made without a movement of the coarse positioner to a different track group because the fine positioner requires additional time to overcome the induced mechanical shock caused by the coarse positioner movement.

In the optical disk drive industry are two distinct types of head/media systems currently known. One type of head/media system is that which is commonly employed in CD players. It uses a non-flying head and substrate incident media. The other type of head/media system uses a flying head and air incident media. These two head/media systems are seen as intrinsically incompatible.

Flying heads can be used to obtain higher storage capacity than non-flying heads. The flying head uses an air bearing to maintain a substantially fixed separation distance from the disk or the media, and hence a fixed focus. This air bearing requires a clean environment in which to operate as the air film separating the head from the disk can be as thin as 1 microinch. The head should never touch the disk. Dirt on the head or disk may cause a head crash. This head must also have very low mass optics in order to fly effectively, and in most cases the optics will be focused near the surface on which the head is flying. This is referred to as air incident.

Conversely, a non-flying head requires a focus actuator to focus the optics with respect to the media. Typically, this head focuses through a transparent substrate to a recording layer of the media in Digital Video Disk (DVD) or CD technology. In both cases this is referred to as substrate incident. Substrate incident disks are fairly immune to dirt because the light is not focused on the exposed surface, but rather a larger cross-section of light passes through the transparent substrate and converges to focus on the recording layer on the opposite side of the substrate. Thus, any dirt on the disk surface obscures but a fraction of the light focused through the disk.

The path the converting beam takes through the disk alters the light waves as they refract through the surface. This refraction causes spherical aberration of the focused beam. In contrast, the focussed beam in the air incident case does not exhibit spherical aberration. However, a spherical aberration correction can be built into the design of the optical elements. This correction, then requires that the light pass through a substrate. The optical elements all tend to have apertures >3 mm in diameter so that the desired working distances to the media can be maintained.

Each type of system—flying and non-flying has its advantages. The non-flying head system is more rugged with well established industry standards. The flying head system, however, obtains a much higher recording density.

Conventional magneto-optic systems did use a two-head system in some instances. The purpose was to achieve direct-overwrite. Density was not improved. However, this implementation was in a sense the worst implementation because it had neither the robustness of substrate incident performance and compatibility nor the density gain associated with an optical flying head approach.

Conventional systems do not mix head technologies such as flying heads with remotely positioned non-flying heads such as used in CD players. These technologies are generally thought to be incompatible with each other. However, as disk types proliferate, this incompatibility results in a proliferation of corresponding disk drive systems to record and reproduce data.

It is an object of the present invention to provide an improved disk drive system.

SUMMARY OF THE INVENTION

One embodiment of the invention is realized in a head positioner for an optical disk drive, comprising a flying optical head; a coarse positioner having a coarse positional resolution; and a head carriage coupled to the coarse positioner such that the head carriage is positioned by the coarse positioner, the head carriage including a fine positioner, the flying optical head being mounted to the fine positioner, and the fine positioner having a fine positioning resolution less than the coarse positional resolution.

In another embodiment of the invention there is provided a mechanism for an optical disk drive, which receives a recording medium having a target track. The mechanism comprises a flying optical head; a head carriage, the head being mountable thereto; and a coarse positioner capable of positioning the head to within a distance of the target track equal to a coarse positional resolution; means for positioning the head to within a distance of the target track equal to a fine positional resolution of less than the coarse positional resolution.

The invention may further be practiced as a method for positioning a flying optical head mounted to a head carriage to a target position in an optical disk drive. Such a method includes steps of positioning the head carriage within a distance of the target position equal to a first positional resolution; and rotating the head carriage to position the head within a distance of the target position equal to a second positional resolution less than the first positional resolution.

Another embodiment of a head positioner for an optical disk drive includes a flying optical head; a coarse positioner having a coarse positional resolution; and a head carriage to which the head is mounted, the head carriage pivotally mounted at a center of gravity of the head carriage to the coarse positioner, the head carriage including a motor that is capable of pivoting the head carriage so as to move the head with a positional resolution less than the coarse positional resolution.

A mechanism for an optical disk drive, which receives a recording medium having a target track, can also embody the invention. Such a mechanism includes a flying optical head; a coarse positioner; and means mounted to the coarse positioner to which the head is mounted, for moving the head to within a distance of the target track equal to a positional resolution of less than that of the coarse positioner.

Finally, the invention may be embodied in a head positioner for a disk drive. Such a head positioner includes a flying head; a coarse positioner having a coarse positional resolution; a head carriage coupled to the coarse positioner such that the head carriage is positioned by the coarse positioner, the head carriage including a fine positioner, the flying head being mounted to the fine positioner, and the fine positioner having a fine positioning resolution less than the coarse positional resolution; a sensor having an output representative of a flying height of the flying head above the medium; a controller having an input coupled to the sensor output and having a control output; and an actuator having an input coupled to the controller control output, the actuator arranged to apply a variable load force to the flying head through the head carriage, responsive to the controller control output.

BRIEF DESCRIPTION OF THE DRAWINGS

In the Figures in which like reference designations indicate like elements.

DETAILED DESCRIPTION

Figure 1:
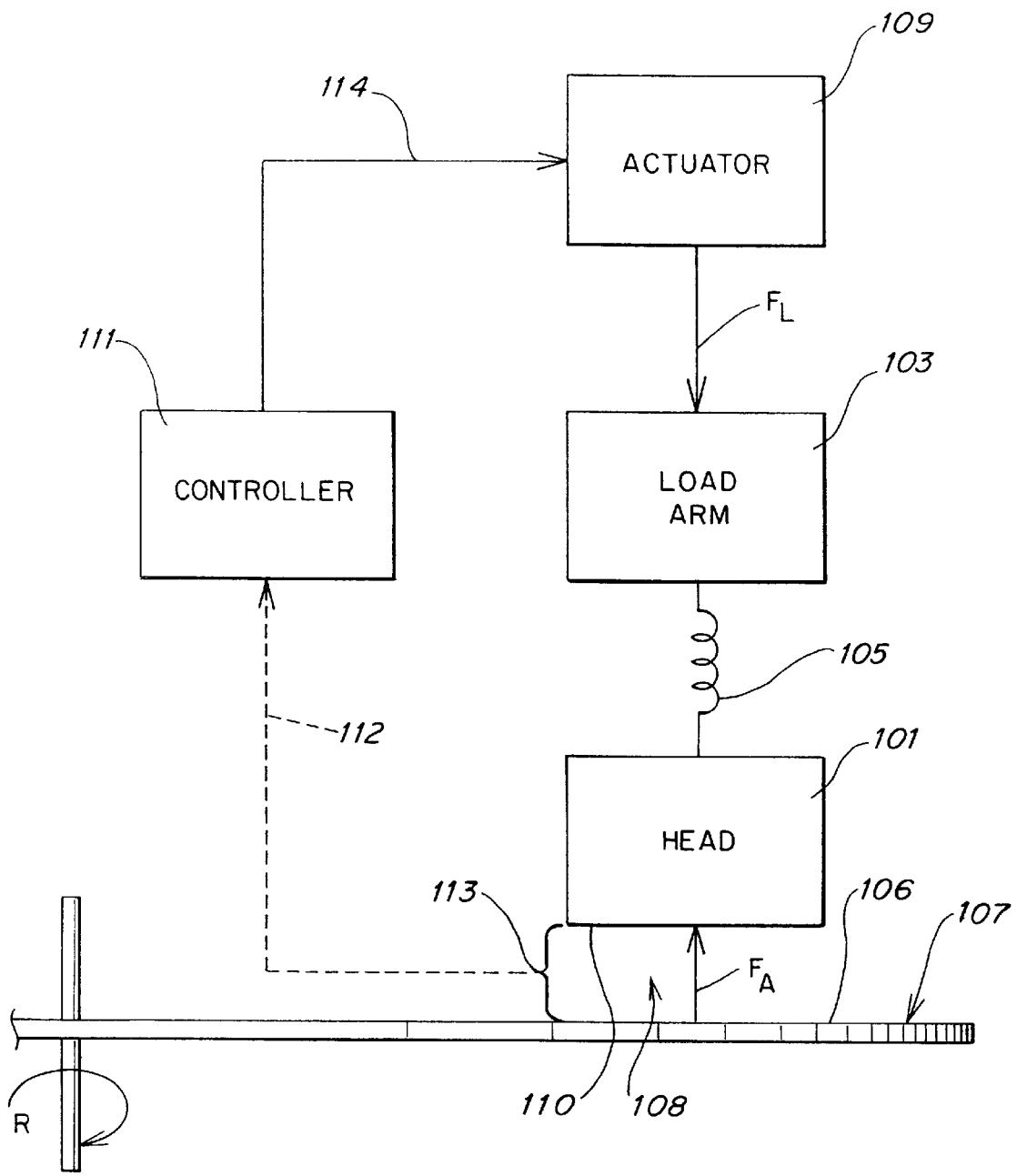
FIG. 1 is a schematic block diagram of a feedback controlled flying head load mechanism illustrating aspects of the present invention.

The present invention will be better understood upon reading the following detailed description of various illustrative embodiments of the invention, in connection with the figures.

The present invention solves numerous problems of the prior art and provides additional design flexibility not available in conventional systems. For example, when the principles of the invention are applied, a system may be constructed which adapts itself to two or more media types, while improving positioning resolution and shock resistance.

One illustrative application for the present invention is in an optical disk drive including two different heads mounted to a single head carriage. Such an arrangement permits the drive to be used with different types of media, each accessed by one of the two different types of heads. For example, one head may be a surface incident head, which is mounted at a substantial distance from the disk surface, and through which a laser beam is focused onto the media surface. A second head may be a flying head, for example a head carrying a solid immersion lens (SIL), sometimes referred to as an air incident head, which is maintained at a very close spacing from the disk surface.

When a disk is loaded into the disk drive, a determination is made as to which type of media is present, and consequently, which type of head is to be used. The determination may be made on the basis of an extrinsic quality, such as an indicator marking or a label on the disk or on a cartridge containing the disk. Alternatively, the determination may be made on the basis of an intrinsic quality, such as the reflectivity of the disk recording surface. The surface incident head may be used to make the reflectivity measurement on the basis of which the determination is made, without risking damage to the flying head by flying it over a wrong type of medium.

In accordance with other principles of the invention, the head or heads may be mounted to a rotary fine positioning actuator as described in detail below. The heads are mounted in a position such that the rotary fine positioner is counter-balanced and rotates about its center of gravity. Such an arrangement improves the immunity of the fine positioning system to externally applied shock and vibration, as well as to extended settling transients when the coarse positioner moves.

Finally, any of the above-described arrangements are advantageously combined with a system for applying an adjustable load force to a flying optical head, as described in detail below. The flying height of the flying head may thereby be controlled through load force adjustments.

One of the present inventors' related applications, entitled FLYING HEAD WITH ADJUSTABLE ACTUATOR LOAD, filed Feb. 21, 1997, Ser. No. 08/804,301 (hereafter referred to as "the actuator load application"), incorporated herein by reference, teaches a method and apparatus for maintaining a flying head at a flying height substantially equal to the actual minimum glide height for each data track of the disk over which the head is flown, despite variation in the minimum glide height from the nominal or design minimum glide height, and despite variations in other parameters affecting flying height. The related application teaches that this can be accomplished by measuring the actual minimum glide height at points along the disk while accessing data. The measurement can be made by detecting whether, and how often, the flying head contacts surface asperities of the disk. The flying head is lowered toward the surface of the disk to a point where a low incidence of contact with surface asperities is detected, that point being just below the minimum glide height as defined above. The flying height of the head is then controlled to maintain the head just out of range of such contacts, i.e., at the minimum glide height. As discussed further, below, the minimum glide height is determined indirectly by examining a sensor signal for evidence of the head "ringing" at its mechanical resonant frequency. Such evidence is a signal amplitude at the resonant frequency. A flying head may be provided that includes an integrated head/disk interference or contact sensor that can be used to measure the minimum glide height in conjunction with a system such as the one disclosed in the actuator load application.

As described above, in the system described in the actuator load application, the head is flown at the minimum glide height, which will vary slightly from disk to disk. For optical systems that employ a lens on the flying head, that variation, in combination with small variations in lens shape and placement of lens elements relative to each other and relative to the air bearing of the head, can cause the lens system to fail to focus optimally at the minimum glide height. According to another of the present inventors' related applications, entitled METHOD AND APPARATUS FOR DETECTING THE MINIMUM GLIDE HEIGHT OF A FLYING HEAD AND FOR FOCUSING A LENS CARRIED ON A FLYING HEAD, filed Mar. 26, 1997, Ser. No. 08/824,605 (hereafter referred to as "the detecting/focusing application"), incorporated herein by reference, a flying head is provided that includes a lens with an element that is movably mounted relative to the head, so that the lens can be focused independently of the flying height of the head. In view of current manufacturing tolerances, movement of the lens element of about 0.5 µm is useful, but it will be apparent upon reading the detecting/focusing application that other ranges of movement are also useful. A head with an independently focusable lens is useful in the above-described system where the flying height of the head varies to match the minimum glide height, as well as those where the head is not flown at the minimum glide height.

The aspects of the detecting/focusing application and the actuator load application are advantageously combined by providing a flying head with a single transducer that both generates a signal indicative of head-disk interference, and also is capable of moving and focusing the lens independent of flying height.

Figure 7:
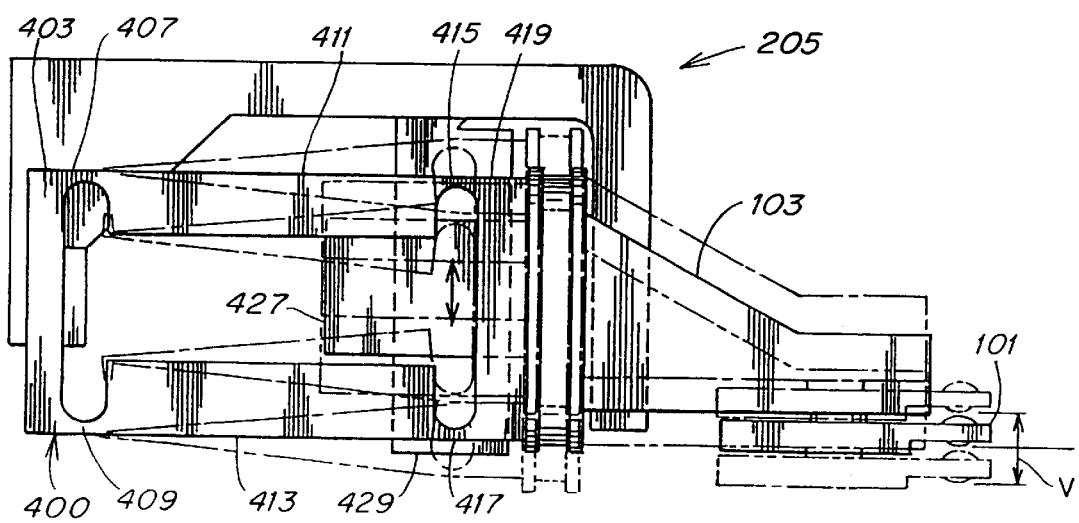
FIG. 7 is a side elevation view showing the movement of the head suspension of FIGS. 2–6.
Figure 8:
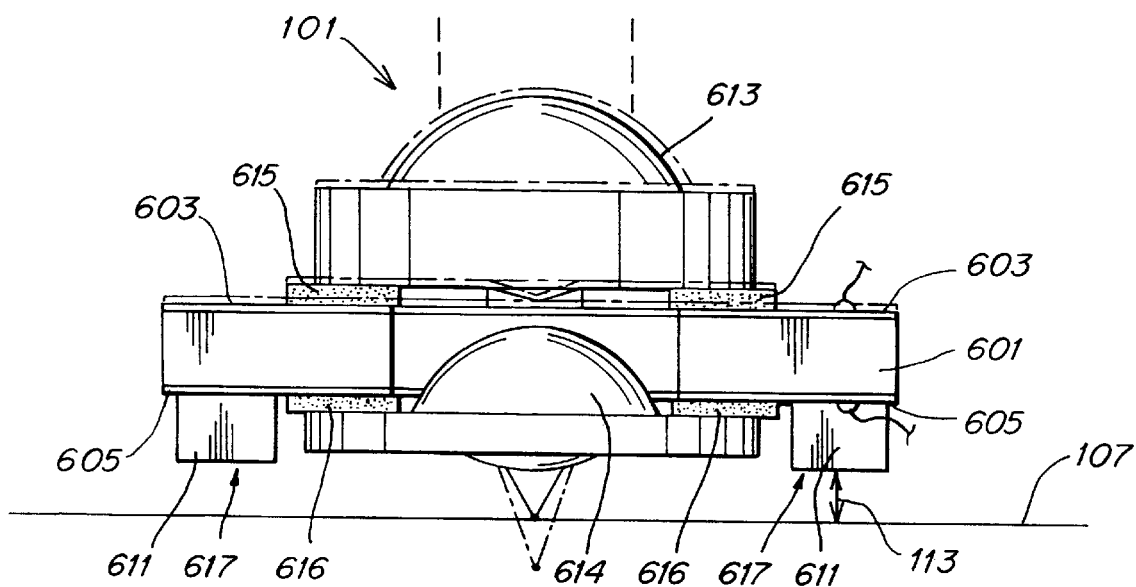
FIG. 8 is an end elevation view of an embodiment of the invention directed to a head including an integrated focus actuator and head/disk interference sensor.

One embodiment of a flying head that incorporates aspects of the actuator load application and is described in the detecting/focusing application is shown in FIG. 8 and includes a body 601 formed of a piezoelectric ceramic material, such as PZT. However, it should be understood that the invention is not limited to use of this or any other particular material. Additional illustrative embodiments using other materials are described below. Outriggers 611 defining the air bearing surface 617 are bonded to the block of piezoelectric ceramic, and can be formed of a conventional ceramic material, glass or any of a number of other materials. A lens element 613 is bonded at 615 to a surface of the head away from the air bearing surface 617 and a lens element 614 is bonded at 616 to a lower surface of the head. The surface to which the lens element 613 is mounted is movable by body 601 to control focusing of the lens as discussed below. The body 601 includes electrodes 603 and 605 formed thereon. Although two are shown, more can be used. Across the electrodes 603 and 605, a signal is generated representative of stresses under which the body 601 of the head 101 is placed. For example, if the head 101 were to fly too close to the surface 106 of the disk 107, at some point striking the surface 106 of the disk 107, then the head 101 will "ring" or vibrate at a natural frequency dependent upon the mass of head 101 and the characteristics of the air bearing and suspension. A signal is generated across electrodes 603 and 605 at the natural frequency at which the head 101 rings. The amplitude of this signal indicating contact between the head 101 and the disk surface 107 (FIG. 7) is an indicator of head flying height 113 below the minimum glide height because more frequent contact between the head 101 and the disk surface 106 causes the ringing to be reinforced, resulting in a larger signal amplitude. The use of this signal is discussed in greater detail in connection with the controller 111 of FIG. 1.

The use of the piezoelectric material to form the body 601 in this embodiment of a flying head is advantageous because this material is a two-way transducer between electrical and mechanical energy. The block of piezoelectric material generates an electrical signal at the conductive electrodes 603 and 605 which varies with mechanical excitation of the head 101. For example, as discussed above, when the head 101 hits an asperity on the surface of the disk 107, the head 101 will ring at a natural frequency of vibration. The mechanical energy of that vibration is then transduced into electrical energy forming the signal at electrodes 603 and 605. The piezoelectric material can also convert electrical energy in the form of an electrical signal applied at the electrodes 603 and 605 into an expansion of the body 601. This expansion can move the lens 613, which is mounted to body 601, independent of changes in the flying height 113, thereby allowing focus adjustments without changing flying height 113, as discussed in the detecting/focusing application.

As discussed in the detecting/focusing application alternate embodiments can provide a similar advantage by employing other materials that act as a two-way transducer between electrical and mechanical energy, such as an electrostrictive material or a magnetostrictive material. These are discussed in detail in the detecting/focusing application.

The head discussed above in connection with FIG. 8, which may be used in embodiments of the present invention, advantageously includes at least a portion thereof that is formed from a material that is a two-way transducer so that the head includes advantageous features of the present invention directed to the independently focusable lens and the contact sensor. Variations are discussed in the detecting/focusing application. For example, the independently focusable sensor is not limited to a two-way transducer material in the head. Rather, lens elements can be movably mounted to the head in any of a number of other ways that would enable the lens to be focused independently of the flying height of the head. Similarly, the contact sensor is not limited to the use of the two-way transducer materials discussed above. Rather, all that is required is that the head be provided with some type of sensor capable of detecting contact between the disk and head.

Figure 21:
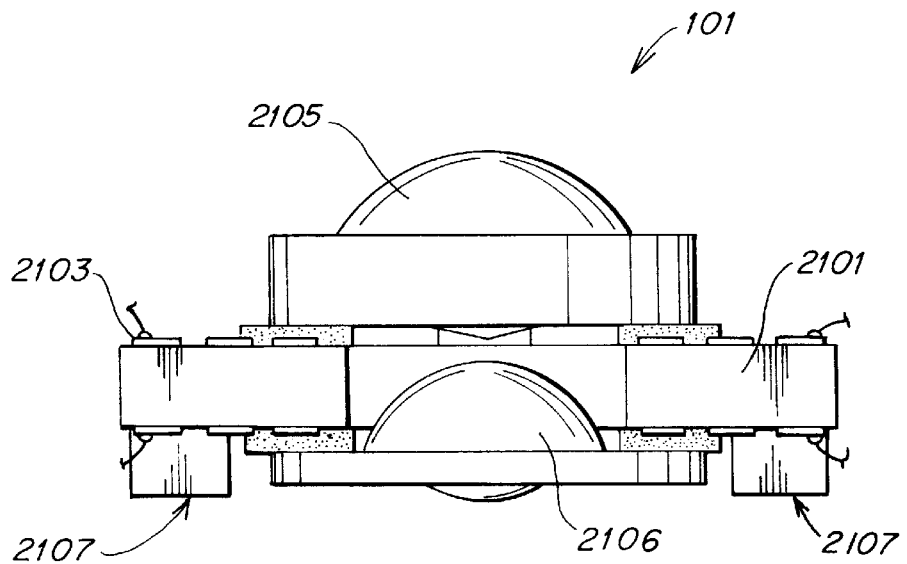
FIG. 21 is an end elevation view of an embodiment of the invention directed to a head including an integrated focus actuator.
Figure 22:
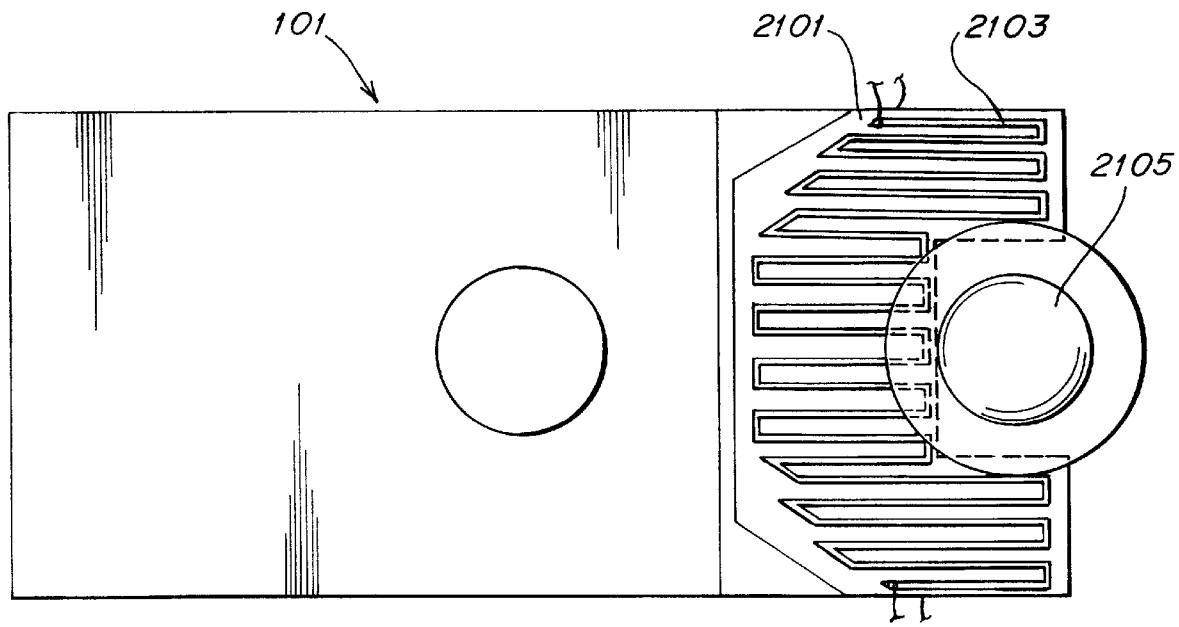
FIG. 22 is a plan view of the head of FIG. 21.

An alternate embodiment of an independently focusable lens system in accordance with the present invention is shown in FIGS. 21 and 22. In this embodiment, the body 2101 of the head 101 is formed of a conventional ceramic material or other material suitable for flying over the recording medium and supporting the lens. A heating element 2103 is formed on a surface of the body 2101 of the head 101, for example, by depositing a serpentine metallic pattern thereon. Causing an electric current to flow through the heating element 2103 generates heat which is transferred into the body 2101 of the head 101. As the body 2103 of the head 101 is heated it expands, displacing the lens element 2105 relative to the air bearing surface 2107 and causes lens element 2106 to alter its focus. The material used for the body 2101 of the head 101 is not limited to ceramic, as any of a number of other materials can be used, each having a coefficient of thermal expansion that is sufficient to provide the desired change in position of the lens to focus it (e.g., approximately 0.5 µm).

As discussed above, one use for the heads of the present invention, including those having integrated focus actuators, head/disk interference sensors, or both, is for use in systems such as described in the inventors' related applications. This use is now described in greater detail, making reference to FIG. 1.

As illustrated in FIG. 1, the flying head 101 is resiliently mounted in a conventional manner to load arm 103 by a resilient member 105 which may be a spring, elastomer or other flexible element. Load arm 103 can be positioned by a positioner mechanism (not shown) to maintain head 101 in close proximity to disk 107. Disk 107 is rotated at high speed, generating an air bearing 108 between air bearing surface 110 and disk surface 106 that produces an upward force $F_A$ upon head 101. The upward force $F_A$ is balanced by a downward load force $F_L$ generated by actuator 109, and acting on the head 101 through load arm 103 and resilient member 105. This embodiment of the invention further includes a feedback path including a controller 111 having an input which receives a signal 112 including a component indicative of the flying height 113 of the head 101 over the disk 107, and in particular of how close the head 101 is flying relative to the minimum glide height.

The system includes a load force actuator 109 that adjusts $F_L$ during normal operation of the head and disk. That is, the actuator adjusts $F_L$ even while the head may be reading information from the disk or writing information to the disk during operation of the disk drive as a component of a computer system. Some embodiments of the system disclosed in the related actuator load application control flying height using a closed loop control architecture that makes adjustments to $F_L$. By controlling $F_L$ even during operation of the head and disk, the actuator can adjust $F_L$ to compensate for known or measured variations in $F_A$ or other parameters that vary during such operation. For example, as atmospheric pressure slowly changes over time during operation of the disk drive, flying height can be controlled by automatically adjusting $F_L$ to compensate for changes in $F_A$ caused by the variation in atmospheric pressure.

The load force actuator 109 can control flying height to maintain the head at the minimum glide height for the disk, in contrast to conventional load-setting mechanisms which fly the head above the minimum glide height to accommodate tolerance errors. Maintaining the head at the minimum glide height, without hitting asperities, ensures that reliability remains high, while signal strength is maximized.

In some embodiments of the present invention, signal 112 includes a head/disk interference component generated by a head/disk contact sensor integrated into the head 101 in the manner discussed above. A contact sensor (e.g., a piezoelectric sensor, electrostrictive sensor, magnetostrictive sensor or other transducer of mechanical energy to electrical energy) can be built into the head 101 to detect asperities or bumps on the disk 107. Detecting any asperities indicates the head 101 is too low. The controller 111 produces a control signal output 114 that represents either a force or position command. The controller 111 may be a general purpose data processor, special purpose digital signal processing circuits and software, or analog control circuits, for example. The control signal output 114 of controller 111 is applied to actuator 109, which adjusts the load force $F_L$ in response to the signal 114 to correspondingly adjust the flying height. The actuator 109 can, for example, be a voice coil actuator that produces a force $F_L$ proportional to the control signal.

In the system shown in FIG. 1, the flying head is a damped spring-mass system. The resilient member 105 and the air bearing 108 act as springs suspending the head 101 between the surface of the disk 107 and the load arm 103. The resilient member 105 acts as a spring because of its resiliency. The air bearing 108 acts as a spring because the air itself is a compressible fluid whose pressure varies with the amount of compression.

Damping is an inherent property of both resilient member 105 and air bearing 108, neither of which are perfect springs. The damped spring-mass system enables the flying head to follow rapid (i.e., high frequency) vertical variations in the surface of the disk 107 without imparting vertical motion to load arm 103, much as an automobile suspension enables the tires to follow bumps in the road without imparting vertical motion to the passenger compartment. It should be understood that vertical variations in disk 107 cause variations in $F_A$ which result in variations in flying height. In this art, vertical variations in the surface 106 of the disk 107, whether rapid or not, are called vertical runout. The mass of the head 101 affects the ability of the head 101 to respond to variations in the surface 106 of the disk 107 because greater suspended mass slows the reaction time of the head 101 to variations in the surface 106 of the disk 107, a well-known property of damped spring-mass systems. Therefore, minimizing the mass of the head 101 that moves to follow disk surface variations increases the frequency response of the system (i.e., the ability of the system to follow high frequency surface variations). In addition, increasing the spring constant of the air bearing, i.e., making the air bearing less compressible, for example by changing the geometry of the air bearing surface as is known in this art, also increases frequency response by increasing the mechanical coupling between the disk surface and the head through the air bearing. The resilient member 105, one of whose functions is to permit movement of the head in response to vertical runout, therefore is arranged to permit the head 101 to move vertically by a distance which should be greater than the amplitude of the high frequency component of the vertical runout of the disk. With this condition met, the head 101 responds to the high frequency variations in the surface 106 of the disk 107 and maintains a safe functional flying height.

The high frequency variations in the surface 106 of disk 107 often cause a complex combination of roll, pitch, yaw and radially directed forces on the head 101. As in conventional systems, the systems disclosed in the related actuator load application address these complex forces using a gimbal arrangement, as follows. It should be understood that the disclosed gimbal arrangements are not to be considered limiting, as other gimbal arrangements can also suit this purpose. In an embodiment described in the actuator load application, the resilient member 105 is arranged to serve as a gimbal to allow some roll and pitch motion of head 101 while preventing motion in undesirable directions. Radial motion and yaw motion are undesirable because they cause mispositioning of the head which hinders data reading and writing operations. However, vertical, roll and pitch motions of the head desirably permit the head to follow variations in the surface of the disk without making contact therewith. Therefore, in one embodiment of the system disclosed in the related actuator load application, the effective spring constant of the resilient member 105 is extremely high in radial and yaw directions, and lower in vertical, roll and pitch directions.

Several illustrative embodiments of conventional gimballed resilient members 105 for use in connection with the present invention are discussed later in connection with FIGS. 9–14. Although the illustrated conventional gimbals have been found to be advantageous, there are many suitable conventional gimbal arrangements that could be used in association with the present invention.

The system described generally above is now described in further detail with respect to an embodiment of the invention directed to a flying head system having a controllable load force and including a head with a head/disk interference sensor. The inventive system has an active suspension, in which load force may be dynamically adjusted during use, as compared to a conventional passive suspension that uses a simple damped spring-mass system in which load force is set mechanically. In the illustrative embodiment described, the head is an optical disk drive head. However, it should be understood that the invention is not limited in this respect, and that the disk drive head can be any type of flying head, including but not limited to magnetic and magneto-optic heads.

Figure 2:
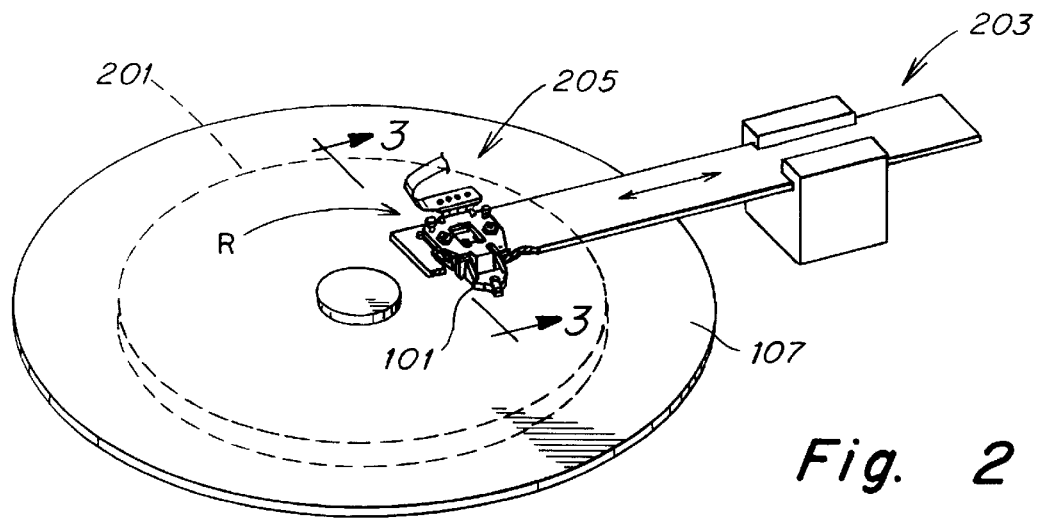
FIG. 2 is a perspective view of a disk drive using a mechanism embodying aspects of the invention.

A simplified perspective view of the elements of an optical disk drive system with which the present invention can be used is shown in FIG. 2. In this simplified view, disk 107 is rotated in direction R by motor 201. A head positioning mechanism 203 radially positions the head 101 at a radius of the disk 107 sought to be read or written to. Each radius of the disk 107 sought to be read or written to is referred to herein as a track. Such radial positioning is referred to as seeking or as motion in a seek direction. The head 101 is connected to the positioning system 203 through an active suspension mechanism 205 that includes load arm 103, gimbal 105 and several additional components shown in greater detail in FIGS. 3–7.

Figure 3:
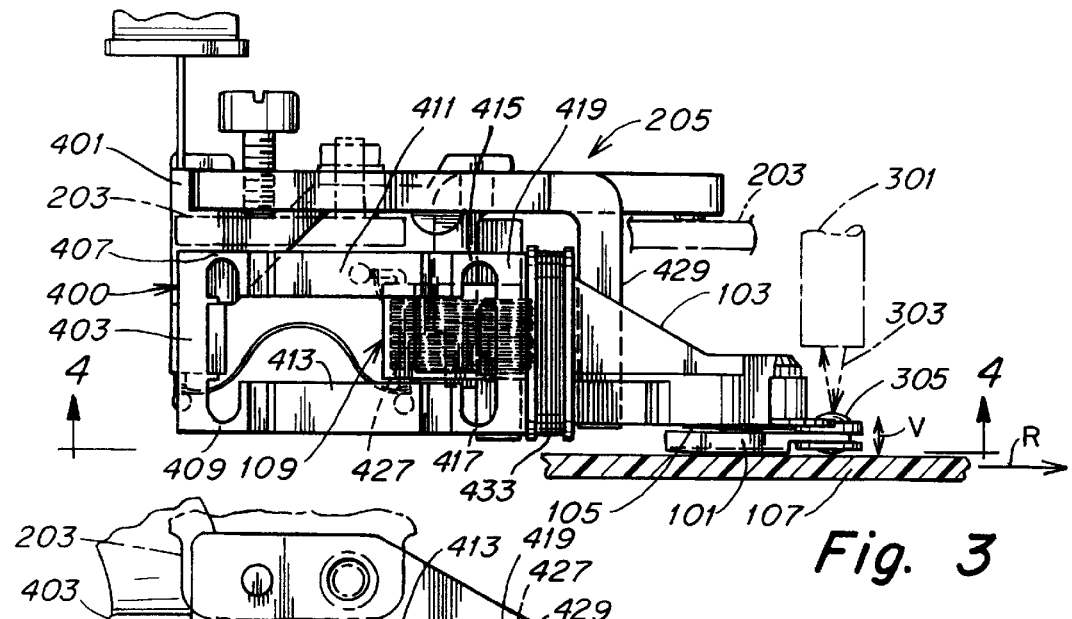
FIG. 3 is a side elevation view of a head suspension used in the disk drive taken along line 3—3 of FIG. 2.
Figure 4:
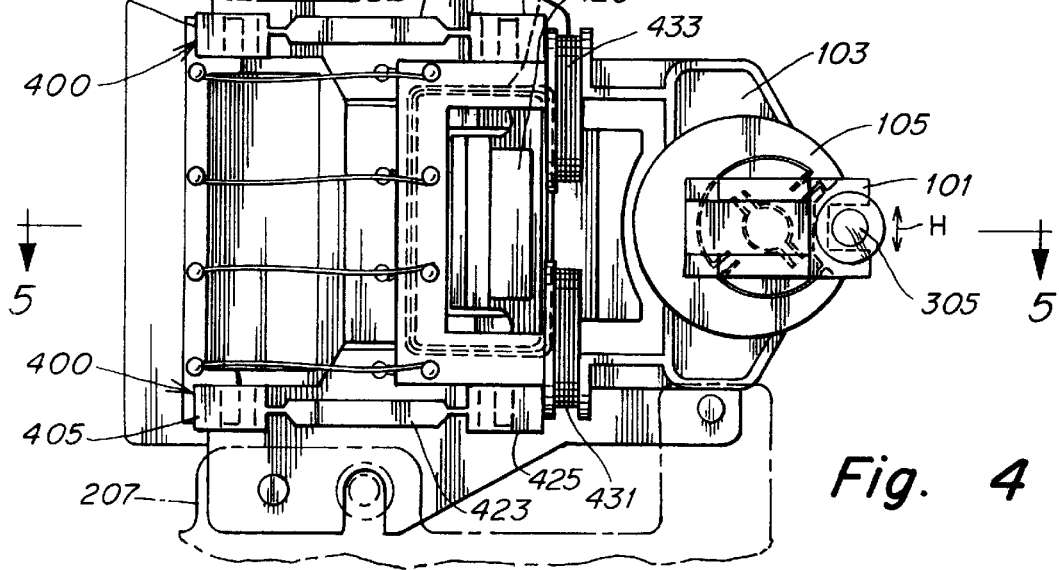
FIG. 4 is a bottom plan view of the head suspension taken along line 4—4 of FIG. 3.

Referring to FIGS. 3 and 4, the rotary motion of disk 107 causes the disk to move past the head 101 in the direction R as shown. The head 101 is attached by a resilient member 105, such as described above, to the load arm 103. Load arm 103 is integrated with an actuator mechanism, generally indicated at 109. Finally, the combined load arm 103 and actuator 109 that carry head 101 are mounted to the positioning system 203. A laser light source 301 shines a laser beam 303 through a lens 305 which is part of head 101.

Figure 6:
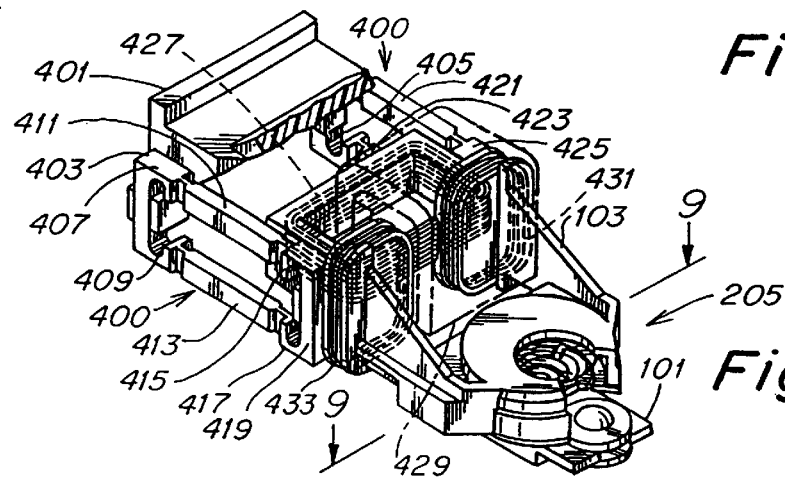
FIG. 6 is a perspective view of the head suspension of FIGS. 2–5.

Conventionally, the load arm would be fixedly mounted to the positioning member 203, so that except for the head responding to vertical runout of the disk surface 106 via the resilient member 105 as described above, only positioning system 203 would move the head 101. However, in this embodiment of the system of the actuator load application, the actuator mechanism 109 produces additional motion in two directions independent of the response of the head 101 to vertical runout of the disk surface 106, and independent of any movements produced by positioning mechanism 203. According to this embodiment of the invention, the actuator includes a vertically oriented voice coil 427 that produces vertical motion by acting on steel member 429. The actuator further includes transversely mounted voice coils 431 and 433 that produce an independent horizontal motion H (FIG. 4) in the seek direction, also by acting on steel member 429. In other embodiments, any one or more of voice coils 427, 431 and 433 can be replaced by a different source of motive force, such as a piezoelectric element. Servo control of horizontal motion H is used to microposition head 101 over a target track after seeking of positioning system 203 is complete. The position of the head relative to the target track is determined by conventional means. The voice coils 431 and 433 are then driven by currents which produce horizontal motion H as needed to position the head relative to the target track. Movable mounts 400 connect the actuator components 109 and load arm 103 to a rigid frame 401 (FIG. 6). The rigid frame 401 is attached to the positioning mechanism 203 so that the entire suspension mechanism (FIG. 2, 205) can be quickly positioned in a desired radial location (i.e., within the micropositioning capability of the actuator mechanism 109 of a desired track) relative to the disk 107.

The actuator 109 of FIGS. 3–4 and its connection to the positioning system 203 through movable mounts 400 is now described in more detail in connection with FIGS. 5–7.

Suspension 205 includes a frame 401 which is rigidly connected to the positioning system 203. A pair of rigid members 403 and 405, elongated in a vertical direction, is affixed to the frame 401. At the ends of rigid member 403 are hinged supports 407 and 409, oriented for flexing in a vertical direction. Hinged supports 407 and 409 do not permit substantially any flexure in a horizontal direction. Hinged supports 407 and 409 attach swing arms 411 and 413 to rigid member 403. When at rest, swing arms 411 and 413 extend perpendicular to member 403 and substantially parallel to each other for equal distances to hinges 415 and 417, which are in turn connected to a second vertically oriented member 419. Similarly, vertical member 405 is connected through swing arms 421 and 423 to a second vertical member 425. Actuator 109 includes a voice coil 427 acting upon a steel member 429 rigidly connected to frame 419 to vertically displace vertical members 410 and 425. Load arm 103 is rigidly attached to vertical members 419 and 425.

The movable mounts 400 can be formed of a resilient plastic material or another resilient material. Thus, the flexible hinged supports act as spring elements which contribute to the ability of the head 101 to follow vertical runout of the disk surface 106.

Figure 5:
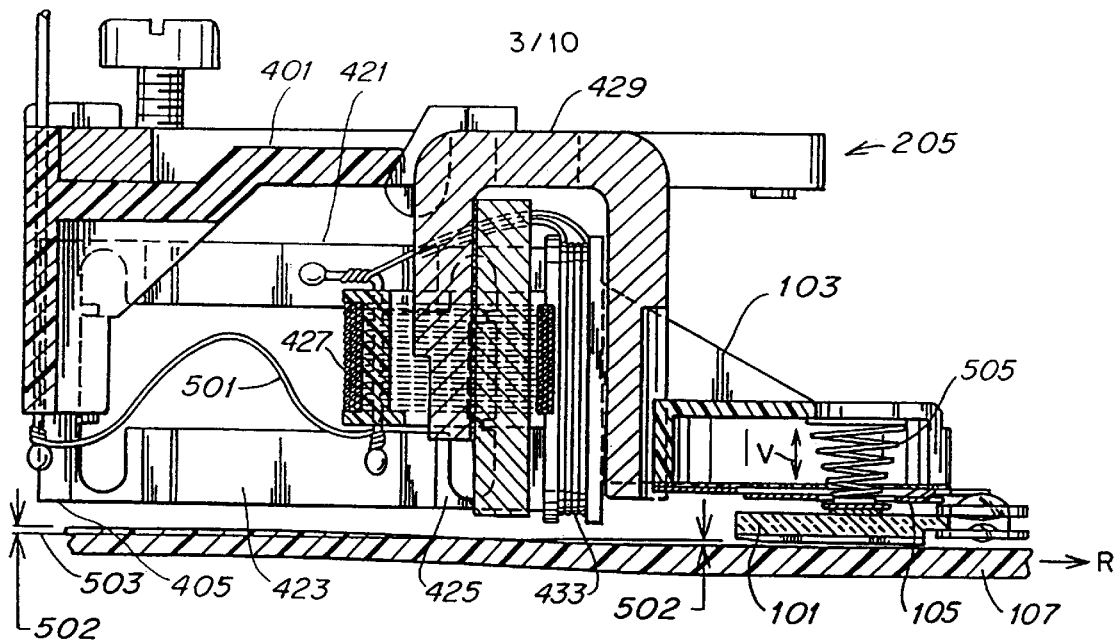
FIG. 5 is a cross-sectional view of the head suspension taken along line 5—5 of FIG. 4.

Referring specifically to FIG. 5, electrical currents applied to input wires 501 of the voice coil 427 produce up and down displacements of the voice coil 427, as indicated by double-headed arrow V, relative to frame 401. Thus, the load arm 103 and head 101 are also displaced relative to frame 401 as indicated by arrow V. As seen in FIG. 5, disk 107 may include surface perturbations 502 from a nominally flat surface 503. Perturbations 502 are slow variations, relative to the asperities discussed above. Disk motion in direction R causes head 101 to fly a small distance above disk 107. When the vertical runout of the disk 107 causes the surface of the disk 106 to move towards the head 101, the air bearing force $F_A$ increases, forcing the head upward. The head deforms the resilient member 105 as indicated by arrow V. Resilient member 105 and spring 505, when provided, are deformed by the movement of the head 101, as indicated by arrow V, until the force applied by deformable member 105 is equal to and opposite the air bearing force $F_A$. The stiffness of resilient member 105 can be set by the choice of materials and configuration of deformable member 105, and can be supplemented by providing the assistance of spring 505. The configurations of the actuator 109 described in connection with FIGS. 3–7 are merely illustrative, and the invention is not limited to any one of these.

Actuator 109 can be included as part of a closed loop feedback system capable of following at least low frequency vertical runout of the surface 106 of disk 107. When part of a closed loop feedback system as described above in connection with FIG. 1, actuator 109 can produce variations in load force to displace the head 101 and cause the head to follow corresponding low frequency displacements (FIG. 5, 502) in the disk surface 107 from the nominally flat condition (FIG. 5, 503), while deformation of the resilient member 105 as described above permits the head 101 to follow high frequency displacements 502 in the disk surface 107.

As previously described in connection with FIG. 1, a signal 112 including a component representative of flying height 113, and including a component indicative of head/disk contact, is processed by the controller 111 to produce the input signal 114 to the actuator 109. While the components of signal 112 may be independent of each other, as described herein, they may also be supplied in the form of a single signal representing both flying height and contact. When using the embodiment of FIGS. 3–7, the controller 111 produces a signal 114 applied to the voice coil input through wires 501. The magnitude of the signal 114 applied depends upon the signal 112. For example, in one illustrative embodiment, the value of the signal representative of the flying height is compared to a set point value indicative of the minimum glide height measured using the head of the present invention. The difference between the set point value and the value of the signal 112 is used to generate the signal 114. The load force applied by actuator 109 is set by the application of electrical currents, i.e., signal 114, to input wires 501 of the voice coil 427.

The component of the signal 112 representative of flying height 113 may be derived in any of several ways. In the illustrative embodiment of an optical disk drive system discussed in connection with FIG. 3, flying height can be determined from characteristics of the laser beam 303, using a detector to detect the beam after it is directed from the source 301, through the lens 305 of the head 101, to the disk surface and then returned to a detector which can, for example, be co-located with source 301. For example, a laser beam focus signal and read signal amplitude can provide information concerning flying height. Derivation of flying height information from a laser beam focus signal is described below. Read signal amplitude also varies with flying height. Since, read signal amplitude decreases monotonically as flying height increases, read signal amplitude defines a measurement of flying height that can be used as the flying height component of signal 112.

Figure 20:
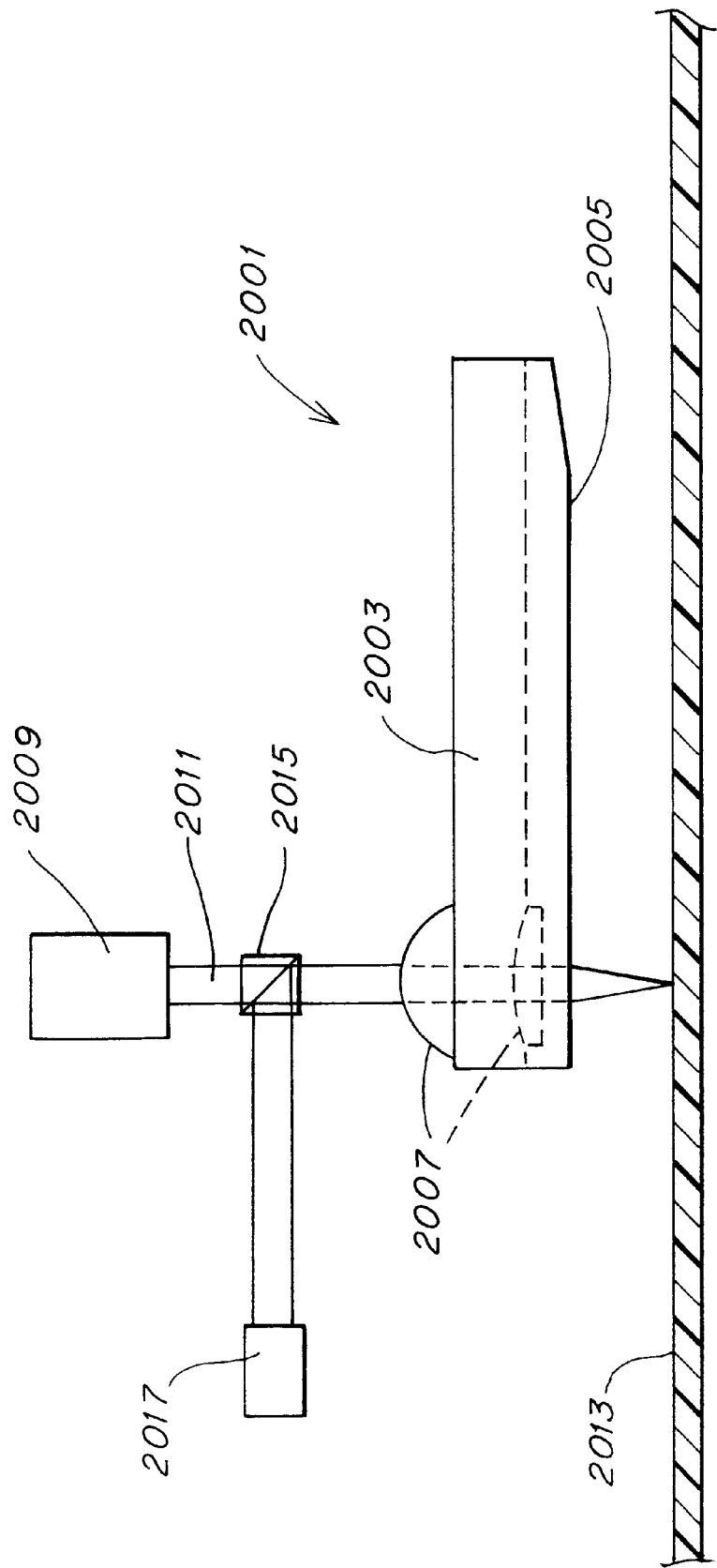
FIG. 20 is a schematic side elevation of a conventional optical flying head flying over a disk surface.

In an illustrative embodiment of the invention in an optical disk drive including a head carrying a solid immersion lens (SIL), a laser focus signal is used to provide the signal 112 representative of flying height. The use of the laser focus signal is advantageous because optical disk drives, such as the one shown in FIG. 20, typically include a focus sensor that, along with its other functions, inherently generates a signal from which flying height of the optical head can be determined. Without any loss of generality, and without limiting the invention to the described embodiment, for the purposes of simplification, the following describes the use of focus signals with SIL heads having a lens with a fixed focal length. Examples of focus sensor systems which are common in optical disk drive applications include Foucault knife-edge sensors, half-aperture focus sensors, and astigmatic sensors employing quad detectors, all known to those skilled in this art. Astigmatic sensors are used in some embodiments of the invention because of their relative immunity to construction tolerance errors.

Focus sensors produce an output signal, called an s-curve because of its general shape around the ideal focus point, whose signal value represents a distance of the lens of the head 101 from the ideal focus point. The ideal focus point is a distance above the disk surface 106. Therefore, the focus sensor output signal inherently represents the distance of the lens of the head 101 above the disk surface 106. The focus sensor output signal may be calibrated in a simple manner, for example, by measuring the focus sensor output signal value at a flying height of zero, i.e., when the disk is not spinning and the head is resting on the surface 106. The gain of the focus sensor is a substantially constant value known from the design of the sensor and relatively insensitive to construction tolerances. Therefore, the flying height can easily be computed by those skilled in the art, knowing the signal value at a flying height of zero, the signal value at the current unknown flying height and the gain of the focus sensor.

The focus sensor output can be filtered using a band pass filter centered on the mechanical resonant frequency of the head. The amplitude of the filtered signal indicates how often the head is contacting asperities on the disk surface. When the head contacts the disk more often, the amplitude of the resonance of the head increases, giving an indication that the flying height is too low.

When the controller 111 adjusts the flying height 113 to the optimum value, i.e., the minimum glide height, the focus sensor may detect an out of focus condition. In the embodiment of the present invention that employs an independently focusable lens mounted to the head, the controller can send a control signal that adjusts the focus of the lens. For example, in the embodiment wherein the head is a two-way transducer or heat element, the controller 111 can apply an excitation signal to the electrodes on the head 101, causing the integral focus actuator to expand or contract as necessary to achieve optimum focus without changing the flying height from the minimum glide height.

As discussed above, in one embodiment of the invention, a piezoelectric transducer, electrostrictive transducer, magnetostrictive transducer or other mechanical-to-electrical transducer is integrated into the head to provide the component of the signal 112 which represents head/disk interference, or contact. When the frequency of such contacts as indicated by the amplitude of the signal at the natural frequency of vibration of the head is too high, then the control signal 114 to the actuator 109 is adjusted to reduce the force $F_L$, thereby increasing the flying height of the head. A flying height that is too high is indicated by the flying height component of the signal 112, for example, by observing an inadequate read signal amplitude, or using a focus error signal in an optical system as described above. In other embodiments, the flying height component of the signal 112 can be determined using other proximity sensors, including proximity sensors which may be mounted to the head, such as a capacitive sensor, a magnetic sensor or an independent optical sensor. Such a proximity sensor, the read signal amplitude or the focus error signal can be used in connection with a contact sensor, such as described above, that provides the component of the signal 112 indicating head/disk contact. In this manner, the controller 111 can not only determine the minimum glide height, but also can measure the displacement of the head from the minimum glide height either toward or away from the surface of the disk. The contact sensor provides a binary indication of whether the head is above or below the minimum glide height. By comparison, the proximity sensor, read signal amplitude or focus error signal provides an output whose value is related to flying height by a predetermined mathematical function. In one embodiment, the controller 111 uses the contact sensor output to find the minimum glide height, and the proximity sensor output, read signal amplitude or focus error signal value at the minimum glide height is then determined. The controller 111 then uses as a set point, the value of the proximity sensor output, read signal amplitude or focus error signal determined by the contact sensor at the minimum glide height.

The system controls flying height to that at which the value of the proximity sensor output equals the set point.

The system described above differs from conventional systems in that a number of tolerances do not affect flying height in this system that do affect flying height in conventional systems. Conventional systems do not drive flying height to equal the minimum glide height because mechanical tolerances and environmental variations that are not compensated for by the dynamic control mechanism could cause such conventional systems to occasionally operate at flying heights less than minimum glide height, resulting in a catastrophic system failure. In contrast, several embodiments of the invention determine minimum glide height by detecting contact with surface asperities while controlling flying height, thus ensuring that each unit produced in accordance with the principles of the invention can fly the head at the actual minimum glide height for that unit.

Figure 9:
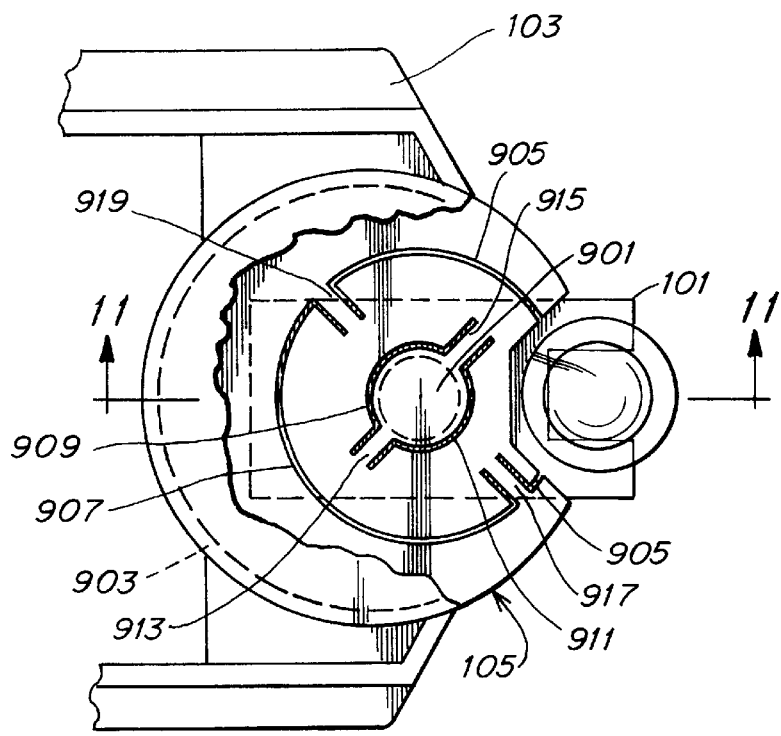
FIG. 9 is a detail view of the head suspension of FIGS. 2–6 taken along line 9—9 of FIG. 6 showing a gimbal.
Figure 10:
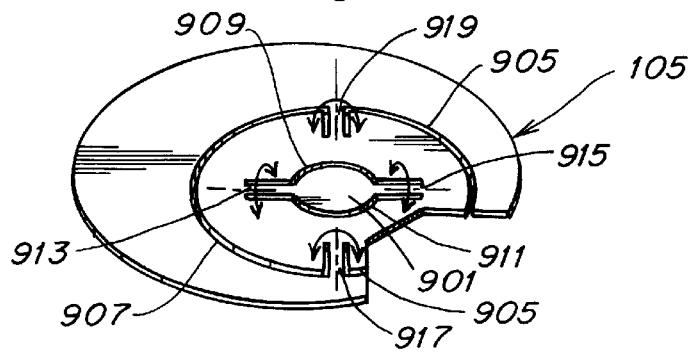
FIG. 10 is a detail view of the gimbal of FIG. 9.
Figure 11:
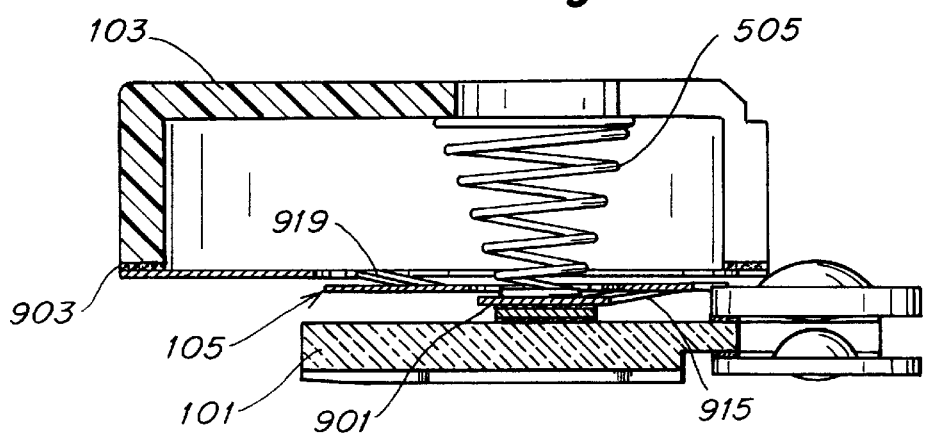
FIG. 11 is a cross-sectional side view of a detail of one embodiment of the head suspension taken along line 11—11 of FIG. 9.
Figure 12:
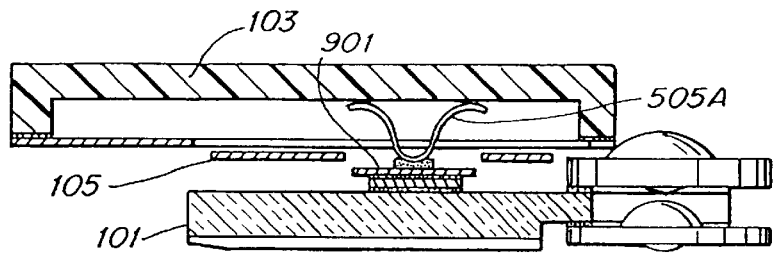
FIG. 12 is a cross-sectional side view of a detail of an alternate embodiment of the head suspension of FIG. 9.
Figure 13:
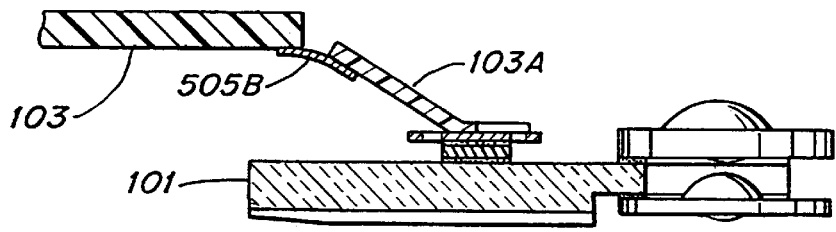
FIG. 13 is a cross-sectional side view of a detail of an alternate embodiment of the head suspension which may be used in place of that of FIG. 9.
Figure 14:
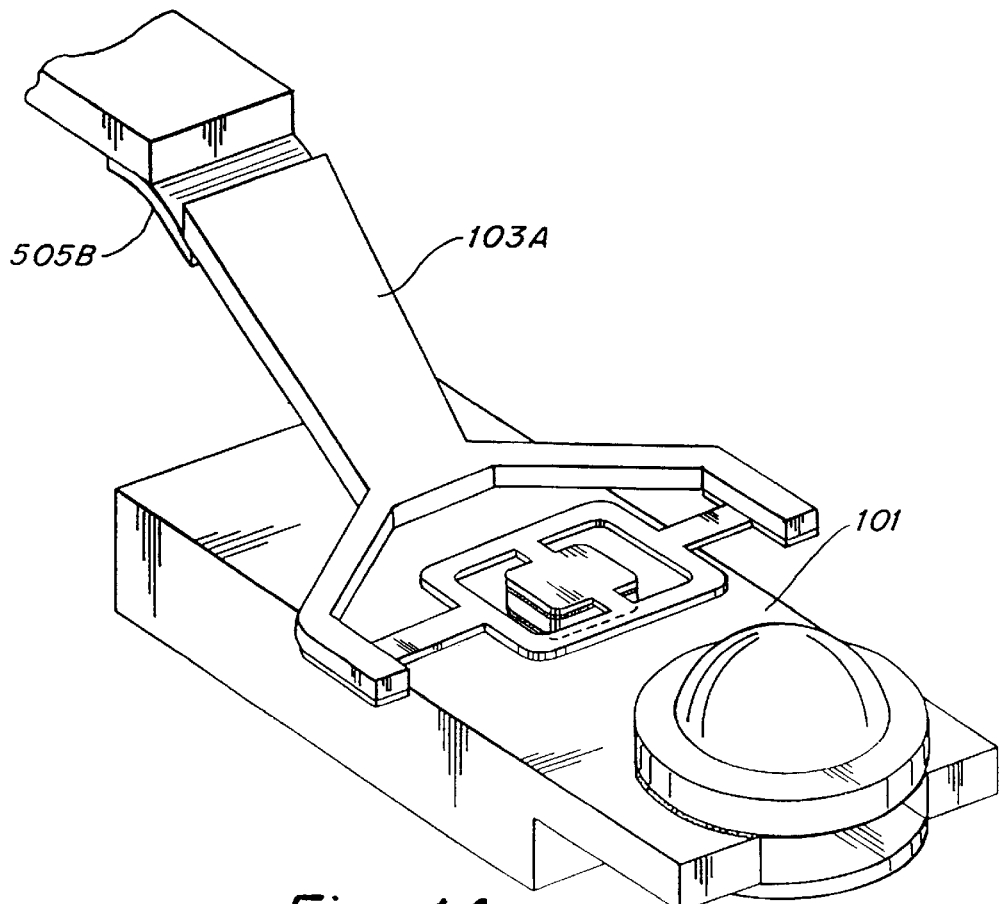
FIG. 14 is a perspective view of the head suspension of FIG. 13.
Figure 15:
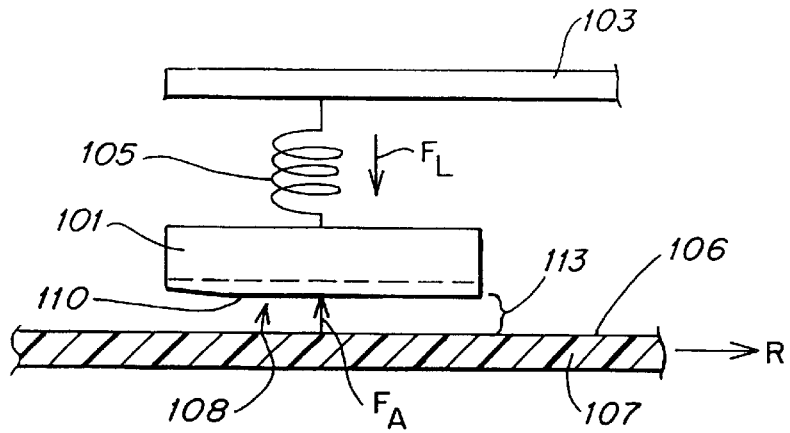
FIG. 15 is a schematic side elevation of a conventional flying head mechanism.
Figure 16:
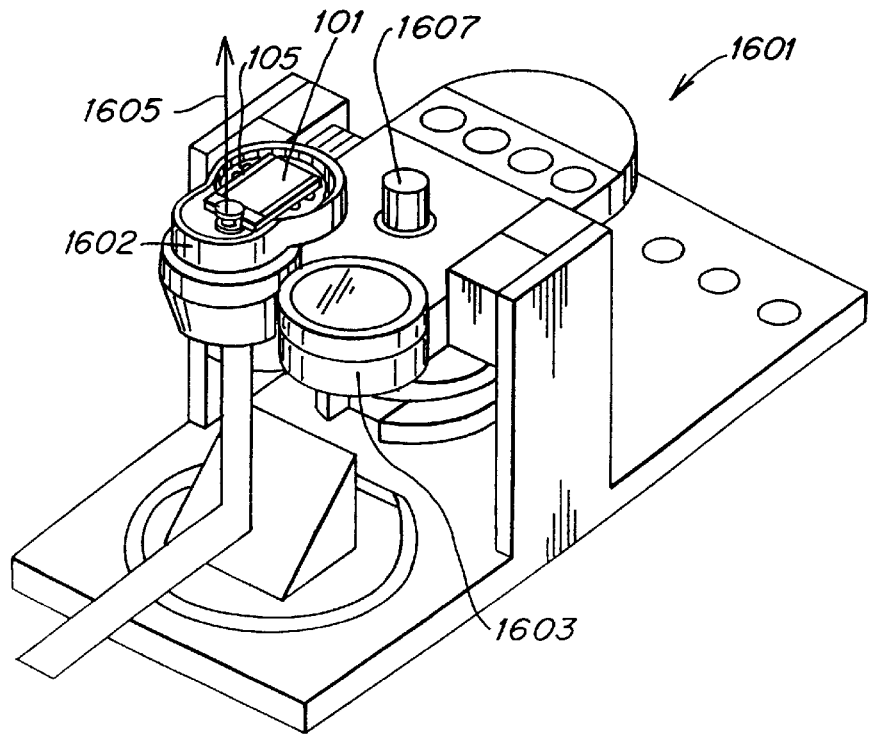
FIG. 16 is a perspective view of a pivoting head carriage assembly for use with a flying head, such as those shown in FIGS. 8, 21 and 22, in accordance with the present invention.

Example gimbal structures for implementing resilient member 105, along with related structures, are now briefly discussed in connection with FIGS. 9–14. One embodiment is shown in FIGS. 9–10; a variation on that embodiment is shown in FIG. 11; a second variation is shown in FIG. 12; and another embodiment is shown in FIGS. 13–14. Although any of these embodiments of a resilient member 105 may be used in connection with the present invention, the present invention is not limited in this respect, and can be used with any of a number of other types of mounting systems.

In the embodiment shown in FIGS. 9–10, the flying head 101 is connected to load arm 103 through gimbal 105. Although an optical head is shown, any flying head according to the present invention may be used in connection with this structure. Slots 905, 907, 909 and 911 are etched into gimbal 105 to permit the gimbal to flex at a lower spring rate in some directions than in others. Yaw and radial motion is substantially inhibited by the substantial cross-sections of gimbal material through which such motion must be transmitted, while motion in the roll and pitch directions is very readily permitted by hinge regions 913, 915, 917 and 919, which act as torsion springs. The gimbal 105 can be, for example, a precision etched thin piece of stainless steel. The head 101 can be attached by applying epoxy to the gimbal 105 in region 901, which is in turn attached to load arm 103 by a quantity of epoxy in region 903. Other adhesives and attachment methods are also suitable, such as high strength glues, interference fits between parts and various clamping arrangements.

In alternate embodiments, the gimballed assembly of FIGS. 9–10 may further include a spring disposed in a position to exert additional downward force, as now described in connection with FIGS. 11–14. FIG. 11 shows an embodiment using a coil spring to exert force at region 901 of the gimbal 105, while FIG. 12 shows an embodiment using a leaf spring to exert force at region 901 of the gimbal 105. FIGS. 13 and 14 show an embodiment in which a leaf spring exerts force on the gimbal 105 through an auxiliary arm.

As seen in FIG. 11, the gimbal 105 has considerable flexibility in a purely vertical 10 direction. In the embodiment shown, an additional optional spring 505 is disposed between region 901 of the gimbal 105 and the load arm 103, to increase the spring rate in the vertical direction without appreciably affecting the spring rate in the roll and pitch directions. In FIG. 11, spring 505 is a coil spring. However, the invention is not limited to using any particular type of spring, as many other types of springs can be used, such as a leaf spring 505A as shown in FIG. 12.

In yet another alternate embodiment shown in FIGS. 13 and 14 load arm 103 is connected through a leaf spring 505B to an auxiliary arm 103A. Head 101 and auxiliary arm 103A are then connected through the gimbal 105 described in connection with FIGS. 9–10.

One advantage of systems such as those described above is that setting and maintaining a proper load force does not require the use of a special jig, removing a disk drive from service or any other action which impairs the useful operation of the unit. The setting of load force may be made and varied during normal drive operation. Load force may be substantially continuously updated to follow changing conditions and maintain an optimum flying height as close to the disk surface as possible without coming into contact with the disk surface, i.e., at the minimum glide height.

Performance of some embodiments of the invention is further enhanced by generating and storing in the controller (FIG. 1, 111) a map of the vertical runout of the disk surface which the head should follow. The map may be applied as an input to the controller (FIG. 1, 111) to provide a bias to the control signal (FIG. 1, 114). As will be understood by those familiar with feedback control systems, this reduces the amount of error in the flying height (FIG. 1, 113), as represented by the flying height signal (FIG. 1, 112), that must be compensated for by adjusting the control signal (FIG. 1, 114). Generation of the map may take place at the time of manufacture or may be performed periodically during periods of non-use of the disk drive. In the latter instance, a special head carriage can be used, as now described in connection with FIGS. 16–19.

The head carriage 1601 of this embodiment incorporates the flying head 101 and suspension 105 features already described above. The head carriage is used in conjunction with a laser beam 1605 similar to that shown in FIG. 3 at 303. A load force actuator (not shown) raises and lowers the head carriage 1601 along a shaft 1607 in the same manner as actuator 109 operates on load arm 103 (FIGS. 1–7), with the head carriage 1601 performing the force transmission and suspension functions served by the load arm 103 in the system of FIGS. 1–7. In addition, the head carriage 1601 carries a non-contact, non-flying lens element 1603, such as a conventional compact disk lens, fixed to the head carriage 1601. The head 101 and suspension 105 are epoxied, glued or otherwise fixedly attached to an adapter ring 1602. The adapter ring 1602 has a spherical base which fits into a spherical socket in the head carriage 1601. The spherical base and spherical socket may be a conventional ball-and-socket joint, a joint between two surfaces having a common curvature defined by the curvature of a sphere, or any similar joint. The illustrated embodiment employs a joint according to the second definition. This allows the adapter ring to be moved, for example by rotating or rocking, to permit the axis of the lens of head 101 to be aligned with the axis of the laser beam 1605, before the adapter ring 1602 is fixedly attached to the head carriage 1601. The described mount using an adapter ring is exemplary, and the invention is not limited to this particular implementation as other mounting techniques are possible.

Figures 17, 18, 19:
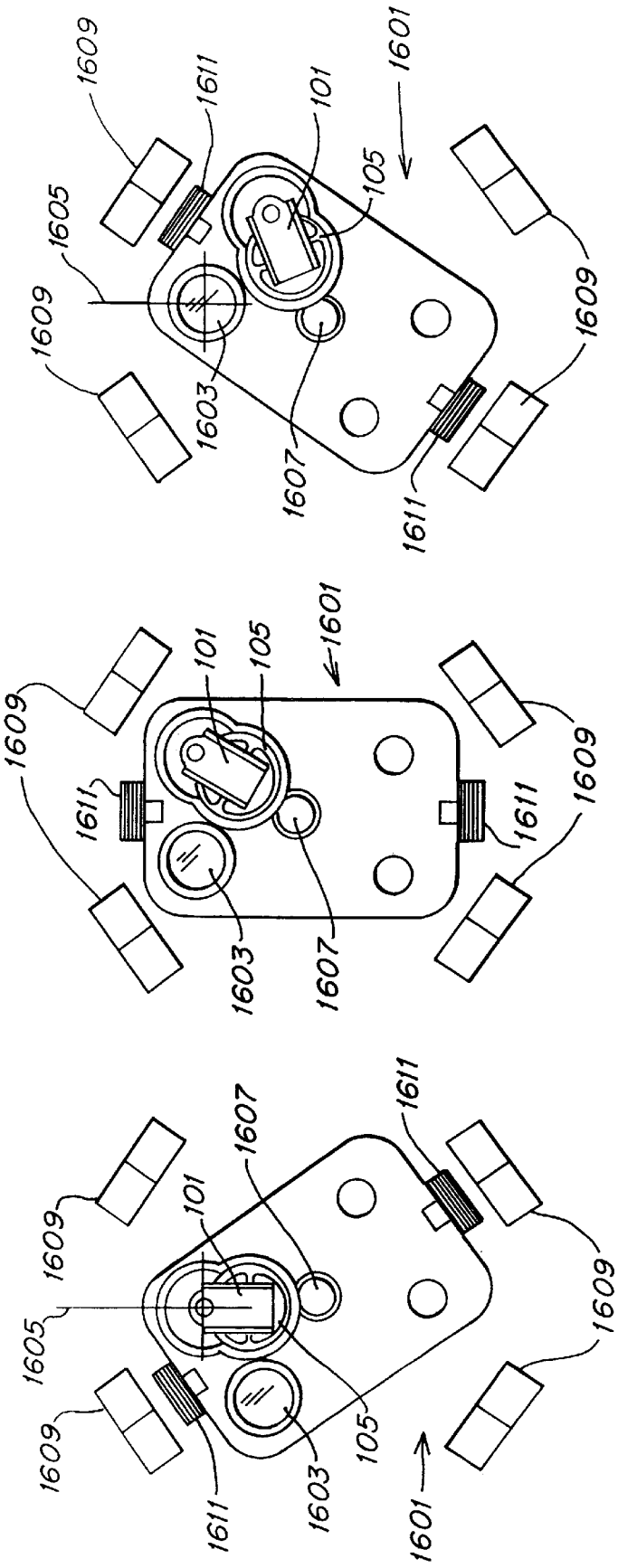
FIGS. 17, 18 and 19 are plan views of the pivoting head carriage assembly of FIG. 16, shown in three different positions.

The head carriage 1601 of this embodiment pivots on shaft 1607 between two substantially fixed positions shown in FIG. 17 and FIG. 19, respectively. The head 101 and lens element 1603 are located at a short radius from the shaft 1607, e.g., about 0.5". In a first position, shown in FIG. 19, the head 101 is positioned for flying over and accessing the recording medium. Magnetic, magneto-optic, optical and other types of flying heads may be used, as the scope of the invention is not limited to any type of head. In the case of an optical head, the first position locates the head 101 in alignment with a laser light source (FIG. 3, 301) as described previously in connection with FIG. 3. The beam from the laser light source is directed along axis 1605.

In a second position shown in FIG. 17, the fixed lens element 1603 is positioned in alignment with the axis along which the laser light beam is directed. A conventional focus sensor of any suitable type, including those previously described, detects a reflection of the beam from the disk surface and produces a time-varying focus signal which varies with the vertical runout of the disk during rotation thereof. A processor included in the controller (FIG. 1, 111) receives the time-varying focus signal, processes the time-varying focus signal and stores the result in a memory in the controller (FIG. 1, 111) as a map of vertical runout of the disk. As a result of processing, the map may comprise a signal based upon one or more measured revolutions of the disk which may or may not have been filtered. Appropriate processing useful for achieving any desired sensitivity and resolution of the map is known.

After storing the map, the head carriage 1601 is pivoted (FIG. 18) from the second position to the first position, in which the head is flown over the medium surface in accordance with the discussion of FIGS. 1–14 to read data, in the normal manner. Magnets 1609 and coils 1611 cause the head carriage 1601 to pivot about shaft 1607 in a manner similar to a two position stepping motor.

The controller (FIG. 1, 111) accesses a map signal representing the stored map, and reads the map back, synchronized with the rotation of the disk. The controller (FIG. 1, 111) applies the map signal as a bias to the actuator control signal 114, whereby the control signal (FIG. 1, 114) is preset to a value which compensates for the known vertical runout as represented by the map. In a feedback control system such as this, use of the biasing technique reduces the stress placed on the system, enabling the system to perform with greater speed and resolution, as previously mentioned.

The head carriage of the embodiments of FIGS. 16–19 can be controlled to provide both fine positioning and coarse positioning capability. Coarse positioning is provided by conventional means, as briefly mentioned above. The coarse positioner moves the entire head carriage 1601 to a track or group of tracks, including a target track. Fine positioning is provided by controlling the signals applied to the coils 1611 to rotate the carriage 1601 through very small angles. With the optical elements located at a radius of approximately 0.5" from the shaft 1607 about which the carriage 1601 rotates, such positioning achieves a resolution sufficiently fine to use with a track pitch of about 0.2 $\mu$m. That is, the optical elements carried by the carriage 1601 can be positioned with a positional resolution less than 0.02 $\mu$m.

In the case of the positioner shown and described in connection with FIGS. 16–19, a particular advantage is realized with respect to immunity to externally applied mechanical shock. The carriage is arranged so that the shaft 1607 about which the carriage 1601 pivots is at the center of gravity of the carriage 1601. Therefore, any coarse positioning motion or externally applied mechanical shock imparted to the shaft 1607 does not disturb the rotational fine position of the carriage 1601 about the shaft 1607. The forces applied to the shaft 1607 are equally distributed to the parts of the carriage 1601 because the carriage is designed with equal masses on each side of every line drawn through the shaft 1607, perpendicular to the shaft 1607.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto and equivalents thereof.

What is claimed is:

1. A head positioner for a disk drive, comprising:
    a flying head;
    a coarse positioner having a coarse positional resolution;
    a head carriage coupled to the coarse positioner such that the head carriage is positioned by the coarse positioner, the head carriage including a fine positioner, the flying head being mounted to the fine positioner, and the fine positioner having a fine positioning resolution less than the coarse positional resolution;
    a sensor having an output representative of a flying height of the flying head above the medium;
    a controller having an input coupled to the sensor output and having a control output; and
    an actuator having an input coupled to the controller control output, the actuator arranged to apply a variable load force to the flying head through the head carriage, responsive to the controller control output.

2. The head positioner of claim 1, wherein the fine positioner further comprises:
    a rotary position motor including a rotor to which the head is mounted.

3. The head positioner of claim 2, wherein the rotary position motor further comprises:
    a stator coupled to the coarse positioner.

4. The head positioner of claim 1, further comprising:
    a laser generating a laser beam following a path through the flying optical head; and
    means to align an optical axis of the head with the path of the laser beam.

5. The head positioner of claim 1, the flying head being a flying optical head, the head positioner further comprising:
    a laser generating a laser beam following a path through the flying optical head; and
    means to align an optical axis of the head with the path of the laser beam.

6. The head positioner of claim 1, wherein
    the head carriage is pivotally mounted at a center of gravity of the head carriage to the coarse positioner, the head carriage including a motor that is capable of pivoting the head carriage so as to move the head with a positional resolution less than the coarse positional resolution.

7. The head positioner of claim 6, wherein the fine positioner further comprises:
    a rotary position motor including a rotor to which the head is mounted.

8. The head positioner of claim 7, wherein the rotary position motor further comprises:
    a stator mounted to the coarse positioner.

9. A head positioner for an optical disk drive for flying a flying optical head over a recording medium, the head positioner comprising:
    a flying optical head;
    a coarse positioner having a coarse positional resolution;
    a head carriage coupled to the coarse positioner such that the head carriage is positioned by the coarse positioner, the head carriage including a fine positioner, the flying optical head being mounted to the fine positioner, and the fine positioner having a fine positioning resolution less than the coarse positional resolution;
    a sensor having an output representative of a flying height of the flying optical head above the medium;
    a controller having an input coupled to the sensor output and having a control output; and
    an actuator having an input coupled to the controller control output, the actuator arranged to apply a variable load force to the flying optical head through the head carriage, responsive to the controller control output.

10. The head positioner of claim 9, wherein the actuator has a stroke sufficient to move the head away from the recording medium to a distance at which the head would not fly and would not contact the recording medium.

11. The head positioner of claim 9, for use in a disk drive including a laser beam following a path, the head positioner further comprising:

a mount which permits the head to be positioned with an optical axis of the head in alignment with the path of the laser beam, the flying head being mounted to the carriage by the mount.

12. The head positioner of claim 11, wherein the mount has a spherical base, and wherein the carriage has a spherical socket that receives the spherical base of the mount, the spherical base and socket cooperating to allow the optical axis of the flying head to be adjusted.

13. A head positioner for an optical disk drive for flying a flying optical head over a recording medium, the head positioner comprising:

a flying optical head;

a coarse positioner having a coarse positional resolution;

a head carriage to which the head is mounted, the head carriage pivotally mounted at a center of gravity of the head carriage to the coarse positioner, the head carriage including a motor that is capable of pivoting the head carriage so as to move the head with a positional resolution less than the coarse positional resolution;

a sensor having an output representative of a flying height of the flying optical head above the medium;

a controller having an input coupled to the sensor output and having a control output; and an actuator having an input coupled to the controller control output, the actuator arranged to apply a variable load force to the flying optical head through the head carriage, responsive to the controller control output.

14. The head positioner of claim 13, wherein the actuator has a stroke sufficient to move the head away from the recording medium to a distance at which the head would not fly and would not contact the recording medium.

15. The head positioner of claim 13, for use in a disk drive including a laser beam following a path, the head positioner further comprising:

a mount which permits the head to be positioned with an optical axis of the head in alignment with the path of the laser beam, the flying head being mounted to the carriage by the mount.

16. The head positioner of claim 15, wherein the mount has a spherical base, and wherein the carriage has a spherical socket that receives the spherical base of the mount, the spherical base and socket cooperating to allow the optical axis of the flying head to be adjusted.

* * * * *